May 8, 1928.  
O. E. BUCKLEY  
SIGNALING SYSTEM  
1,668,888  
Original Filed March 29, 1924  2 Sheets-Sheet 1
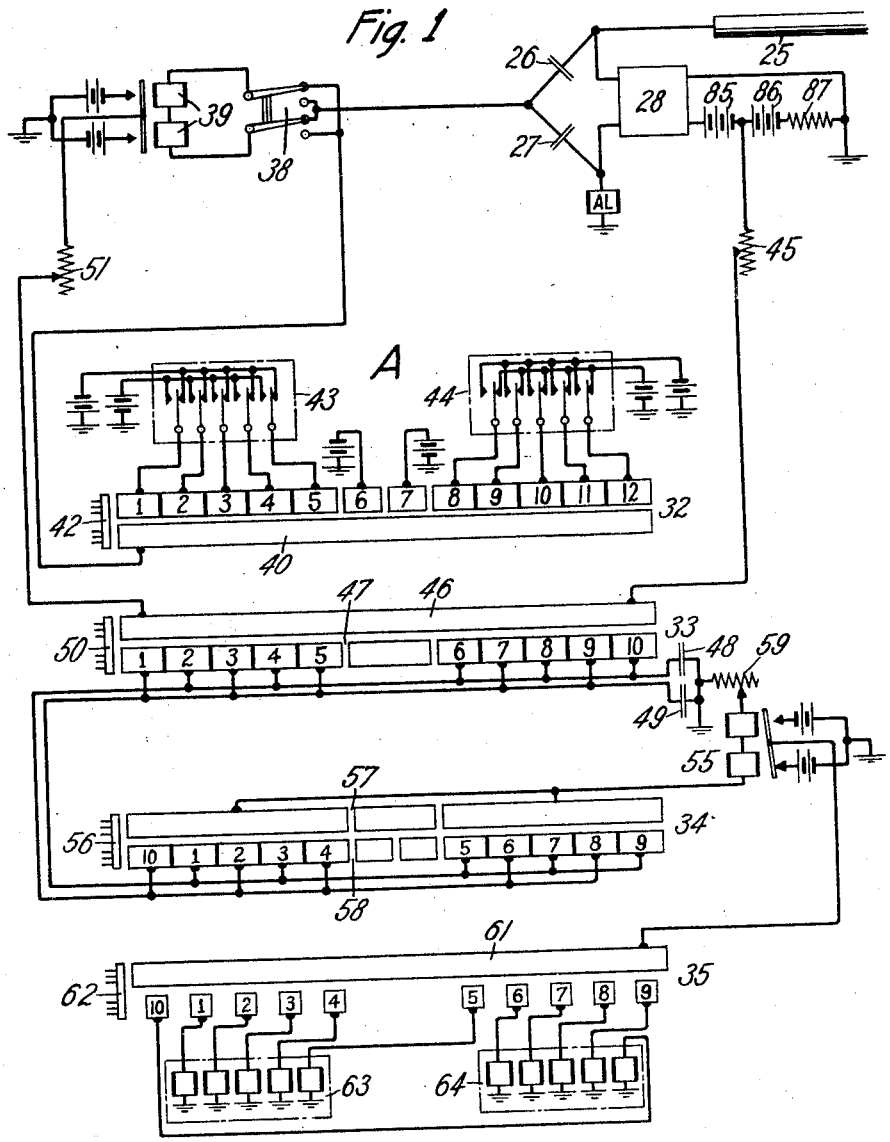
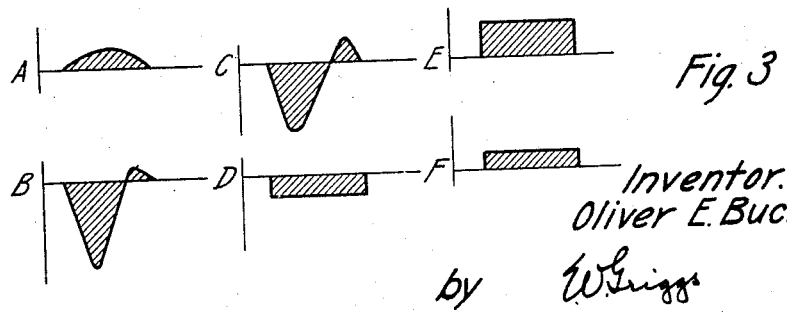
Fig. 3
Inventor:
Oliver E. Buckley
by W. Griggs  Atty.

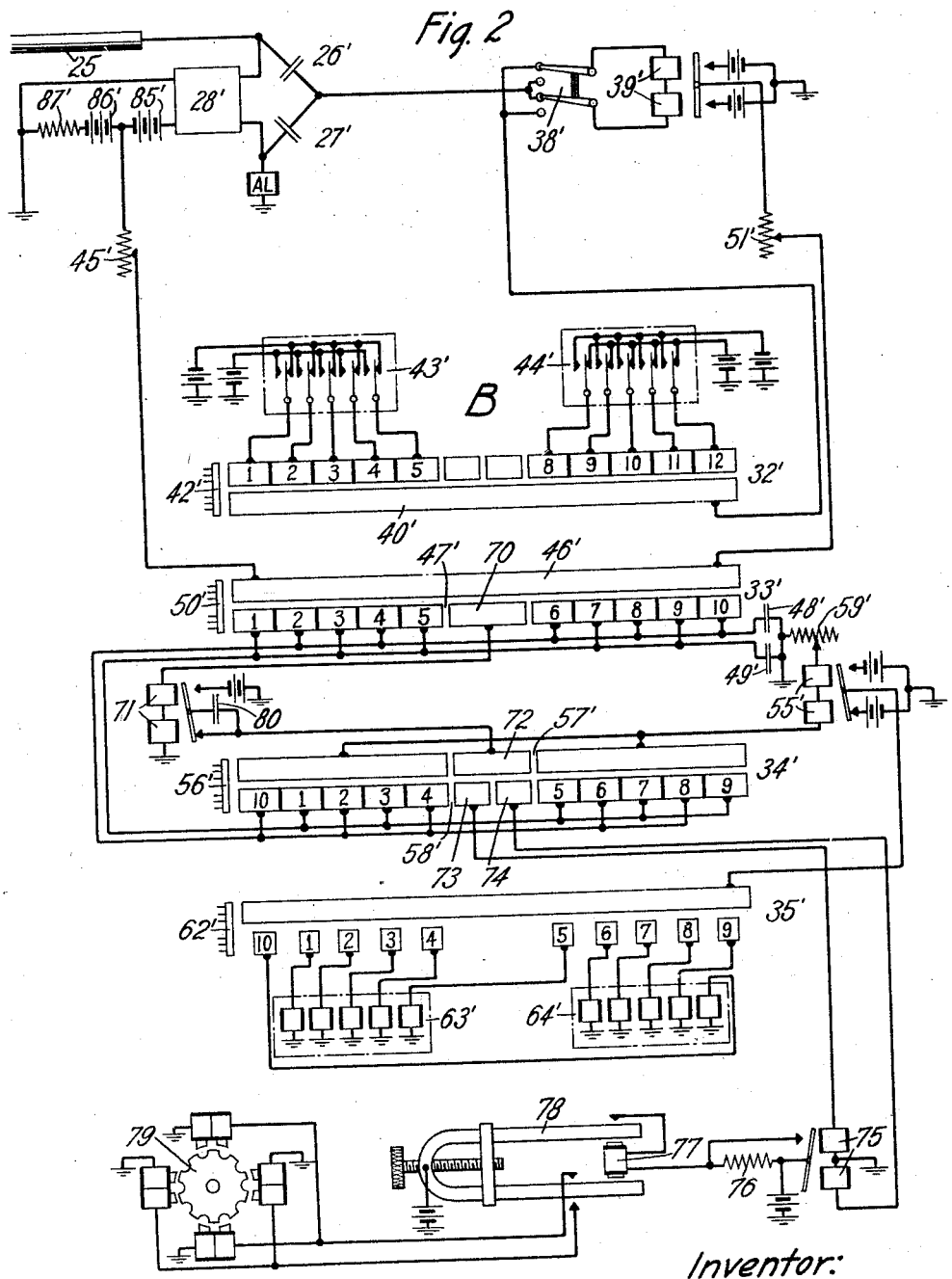

Patented May 8, 1928.

1,668,888

UNITED STATES PATENT OFFICE.

OLIVER E. BUCKLEY, OF MAPLEWOOD, NEW JERSEY, ASSIGNOR TO BELL TELEPHONE LABORATORIES, INCORPORATED, OF NEW YORK, N. Y., A CORPORATION OF NEW YORK.

SIGNALING SYSTEM.

Continuation of application Serial No. 702,723, filed March 29, 1924. This application filed April 30, 1926. Serial No. 105,697.

This invention relates to signaling systems and more particularly to duplex telegraph systems adaptable to operate either with lines or cables.

Heretofore, in the operation of telegraph systems having balancing terminal networks, considerable difficulty has been experienced in obtaining an exact balance between the real line or cable and the associated artificial network. This difficulty is even more pronounced in the operation of systems in which inductive loading is applied to the line or cable, due to the resultant unavoidable variation of resistance and inductance dependent upon the variation in frequency and amplitude of the signaling current impulses. Owing to the character of such lines or cables, the signaling current impulses are attenuated, and currents sufficient to produce objectionable variations in the resistance and inductance of the loaded conductors flow only in a relatively short length of cable nearest the transmitter. However, resulting from these variations, is an unbalance current of large amplitude and high frequency which cannot be eliminated by the balancing methods heretofore employed.

It is the main object of the present invention to overcome the above noted objections by neutralizing the unbalance current due to the dissimilarity between sections of the real line or cable and the artificial line.

In accordance with the above object, the present invention contemplates the provision of means effective in accordance with signaling current impulses impressed on the line or cable for neutralizing an effect resulting from the inaccurate balance between the real line or cable and the artificial line. Specifically, the invention provides obtaining as good a balance as possible between the cable and artificial line and for the storage in an electrostatic means, of the residual unbalance current resulting from the transmitted signal current impulses as well as any signaling current impulses which may, at that moment, be received, and the application of a neutralizing current for neutralizing that portion of the charge on the electrostatic means due to the residual unbalance current. The charge remaining after neutralization of the unbalance current has been effected is the approximate time integral of the received current impulses, on which the unbalance current is superimposed, over a full signal interval. Following this, the accumulated charge is made effective to cause the operation of suitable receiving mechanisms.

This application is a continuation of application Serial No. 702,723, filed March 29, 1924.

This invention is shown schematically in the drawings which when Fig. 2 is on the right of Fig. 1, placed side by side, illustrate a complete system. Fig. 3 shows graphically the successive steps in the reception of a signal and the neutralization of the superposed unbalance current.

Referring to the drawings, there is shown in Figs. 1 and 2 a line conductor or cable 25, preferably of the loaded type, extending between stations A and B at which there are located suitable transmitting and receiving mechanisms together with distributing apparatus for distributing the signaling current impulses to the respective apparatus.

Referring now for a moment to Fig. 1, the line conductor or cable 25 terminates at the station A in a duplex bridge network consisting of two block condensers 26 and 27, an artificial line AL and an amplifier and distortion correcting network 28 which may be of any suitable and well known type. The apex of the ratio arms in which the block condensers 26 and 27 are included is connected through a reversing switch 38 and windings of relay 39 to the continuous ring 40 of the transmitting section 32 of the distributor. In addition to the transmitter section 32, the distributor also comprises a receiving section 33, a discharge section 34 and a distributing section 35. Each of these sections is made up of relatively long segments and smaller segments which are adapted to be bridged by suitable brushes. Preferably, such distributors are of the synchronous multiplex type, although the invention is not limited to such a type of distributing apparatus but may be readily applied to other types of distributing apparatus. The transmitting section 32 of the distributor comprises the continuous ring 40 and a plurality of segments 1 to 12, inclusive. The first five of these segments are connected to the operating elements of an automatic transmitter 43. The segments 8 to 12 are likewise connected to the operating elements of an automatic transmitter 44. Interposed between these two groups of segments are two segments 6 and 7 which are connected to opposite terminals of a battery and which serve upon being bridged with the continuous ring 40 by the brush 42 to transmit over the line or cable 25 impulses for correcting the phase relation of the brush arms of a similar distributor located at station B.

The output circuit of the amplifier or correcting network 28 has one terminal grounded while the other terminal is connected through battery 85 and an adjustable resistance 45 to the continuous ring 46 of the receiving section 33 of the distributor. This section of the distributor like the section 32 also consists of the continuous ring 46 and a plurality of smaller segments which are adapted to be bridged with the continuous ring by means of brush 50. The continuous ring 46 is also connected to the armature of relay 39 through an adjustable resistance 51, serving to regulate the value of the current applied upon the operation of relay 39 to the continuous ring 46. The space separating segments 5 and 6 of the receiving section 33 is equal to the combined length of the segments 6 and 7 of the transmitting section 32 and may be referred to as idle segments which may be used in cases when it is desired to provide for the correction of the phase relation of the distributors in either direction. Alternate segments of the ring 47 of the receiving section 33 are connected together and in turn connected to one terminal of condensers 48 and 49 respectively. Thus, upon the passage of the brush 50 over the respective segments of the ring 47, a charge will be applied to one or both of these condensers depending upon the segment which the brush has at that instant engaged, in accordance with the operation of the relay 39 and the residual unbalance current applied to the amplifier and correcting network 28. Impulses may also, at this time, be received in which case the accumulated current resulting from the received signal current and the residual unbalance will be impressed on one or the other of the condensers 48 and 49. Accordingly, these condensers will be charged.

A discharge circuit for each of these condensers 48 and 49 is established upon the engagement of brush 56 with the segments comprising rings 57 and 58 of the discharge segment 34 through the windings of relay 55 and an adjustable resistance 59. The relay 55 controls, through its armature and contacts, the application of battery to the continuous ring 61 of the distributing section 35 of the distributor arranged to be bridged with the smaller segments 1 to 10 which are connected to the selecting magnets of printers 63 and 64 by means of a brush 62. It is thus seen that should either of the condensers 48 or 49 receive a charge, the accumulated charge resulting from the residual unbalance current will be substantially neutralized, due to the impression of a neutralizing current on the continuous ring 46 in accordance with the operation of relay 39. The signal current impulses which may at that time be received from the line or cable 25 will accordingly be properly recorded.

Referring now for a moment to Fig. 2 which shows apparatus similar to that described in connection with Fig. 1, except that at station B correcting mechanism for correcting the phase relation of the distributor to maintain it in synchronism with the distributor at station A is illustrated. For the sake of clearness, the apparatus similar to that shown in Fig. 1 bears the same reference characters with the prime indices added. Further, only so much of the apparatus as has not been previously described in connection with Fig. 1 will now be described. Segment 70 of the receiving section 33' of the distributor is adapted to be bridged with ring 46' at the same time that brush 42 at station A is passing over segments 6 and 7, and is connected through the windings of a relay 71 to ground. One contact and the armature of this relay is shunted by a condenser 80 and is adapted to be connected to segment 72 of the discharge section 34'. Adapted to be bridged with the segment 72 by means of brush 56' are segments 73 and 74 which are connected to the upper and lower windings of a correcting relay 75. This relay 75 controls through its contacts the short-circuiting of a resistance 76 which is normally connected in circuit with the winding of the driving magnet 77 of the tuning fork 78 which functions to apply operating current to opposite driving magnets of a La Cour motor. As is well understood by those skilled in the art, this motor serves to drive the distributor brush arms on which the respective brushes are mounted. Consequently, impulses which are transmitted from the station A upon the passage of the brush 42 over segments 6 and 7 of the transmitting section 32 of the distributor located at this station will control relay 71 which in turn controls the energization of correcting relay 75 and thereby maintains the distributor at station B in synchronism with the distributor at station A.

The operation of the system and apparatus just described is as follows: The distributor at the correcting or pace-setting station A is first set in motion and its speed of rotation adjusted so that the time required for brush 42 to pass over the transmitting segment as for example segment 1 of the sending section 32 will be the smallest exact divisor of the time required for the signal so transmitted to traverse a line or cable 25 that will permit those signal current impulses so transmitted to be received at the distant end or station B in sufficient amplitude to actuate the receiving mechanism. The distributor at the corrected station B is then adjusted so that the average of the speeds obtained when the correcting relay 75 in both fast and slow positions is the same as the speed of the distributor at the correcting or pace-setting station A.

Once during each revolution of brush 42 at the correcting or pace-setting station A, a positive followed by a negative impulse will be transmitted to the line or cable 25 upon the passage of brush 42 over segments 6 and 7 of the transmitting section 32. The position of the brush 50' at the corrected station B is then adjusted so that it will be passing over segment 70 at the time the reversal of current transmitted from the transmitting station is received. The reversal thus received is amplified and corrected by the amplifier and correcting network 28' and then impressed upon the winding of relay 71 through battery 85' and resistance 45', the continuous ring 46' and segment 70 which causes the armature of relay 71 to be moved away from its lower contact and to engage its upper contact to either the segment 73 or 74 of the discharge ring 34', according to the position occupied by brush 56'. Assuming, for the moment, that brush 56' is upon segment 74, a short impulse due to the applied potential and the discharge of condenser 80 is impressed on the winding of correcting relay 75 which will move its armature against its upper contact thereby short-circuiting resistance 76. This causes the amplitude of vibration of the tuning fork 78 to increase, thus lowering its frequency of vibration which results in a slight reduction in the speed of the driving motor 79. The speed of the brush 56' is therefore slightly retarded and will run slower than the corresponding distributor at the correcting or pace-setting station A until it has dropped sufficiently behind its normal position that it will connect segment 72 with segment 73 of the discharge segment 34' at the time of the reception of a correcting reversal from station A. When this occurs, the impulses due to the charging of condenser 80 will be applied to the winding of relay 75 through the segment 73 of the discharge section 34'. The armature of relay 75 will then leave its upper contact, thereby again inserting resistance 76 in the circuit of the operating magnet 77 of the driving motor 78. The speed of rotation of brush 56' is thereby accelerated and its position with respect to the position of brush 42 at station A is advanced until another correcting impulse causes relay 75 to again retard its speed of rotation. Thus, the distributor at the corrected station B is held at approximately the same speed and approximately the same phase relation with the speed of the distributor at the correcting or pace-setting station A. It should be noted that the correcting impulses are not stored in the condensers 48' and 49' as are the received signal current impulses but are applied directly to the relay 71, the operation of which is thus made independent of the receiving circuits.

During the time allotted to the reception of correcting impulses at the corrected station B no signal current impulses can be transmitted from either station and the received correcting impulses are therefore not subject to distortion or mutilation by unbalance currents.

After synchronism between the two distributors has thus been established, the following additional adjustment must be made before starting the transmission of message impulses. Brushes 50, 56 and 62 at the correcting or pace-setting station A are adjusted so that they will be passing upon their respective segments 1 of ring 47, 10 of ring 58, and 10 of the distributing section 35 at the time brush 42 begins to pass upon segment 1 of the transmitting section 32. At the corrected station B, brushes 42' and 62' are similarly adjusted with respect to the position of brush 56'. The armature of neutralizing relay 39 at station A is adjusted so that it will remain in its midway position between its upper and lower contacts and not make contact with either of them at times when the windings of this relay are not energized by outgoing signaling current impulses. Relay 39' at the corrected station is likewise adjusted. The artificial lines AL at both stations are adjusted to balance as nearly as possible the line or cable 25.

In order to prevent the charging of the condensers when no signals are being transmitted or received the output battery of the amplifier is formed of two portions 85 and 86 and has in series a resistance 87 of such a value that the normal potential drop therein is equal and opposite to that in the battery portion 86. It will be understood that the amplifier 28 is of a type having substantial output impedance such, for example, as a vacuum tube amplifier. The output circuit including the resistance 45 and the condensers 48 and 49 is connected across battery portion 86 and resistance 87 at normally equipotential points, and, so long as no signals are impressed on the input circuit of the amplifier, no current will flow in the output circuit and no charge will be impressed on the condensers. However, when a signal is applied to the input circuit of the amplifier a current flows in the output circuit and the condensers are charged in accordance with the character of the signal.

The transmission of signaling current impulses into the line or cable 25 by the passage of brush 42 on to segment 1 which is connected to the first operating element of the automatic transmitter 43 will produce in the output circuit of the amplifier 28 a current due to the lack of exact balance between the cable and artificial line. The amplified unbalance current in the amplifier output circuit will be applied through resistance 45, continuous ring 46, brush 50, segment 1 to neutralizing condenser 49 which will result in leaving a charge on this condenser when the brush 50 has passed off of segment 1. The charge of this condenser is the approximate integral of the unbalance current over the time occupied by brush 50 in passing over segment 1 and onto segment 2. The transmitted signal current impulse upon the passage of brush 42 onto segment 1 causes the energization of neutralizing relay 39 which moves its armature into engagement with one or the other of its contacts, depending upon the position occupied by the reverse switch 38. Current thus flows from one or the other of the batteries associated with these contacts through the engaged contact and the armature of relay 39, resistance 51, continuous ring 46, brush 50 and segment 1 to condenser 49 which thereupon receives a charge in accordance with the current applied. The quantity of the neutralizing charge thus impressed upon this condenser can, by means of adjusting the resistance 51, be made exactly equal to the quantity of charge impressed upon that condenser by the unbalance current. The position of the reversing switch 38 is so selected that this neutralizing current will also be opposite in sign to that of the charge impressed on the condenser 49 by the residual unbalance current. If, at the instant the signal the signal current impulse was being transmitted due to the engagement of the brush 42 with segment 1, a signal was just beginning to arrive from the distant station, the current in the output circuit of the amplifier and correcting network 28 would be the sum of the amplified received signaling current impulse and the amplified residual balance current so that the charge received by the condenser 49 would represent the time integral of the algebraic sum of the received current impulse and the residual unbalance current. This type of signal is shown graphically in Fig. 3 in which A represents the wave form of the received signaling current, B, the wave form of the unbalance current due to the transmitted signals, and C the algebraic sum of A and B which is the wave form of the current acting upon the condenser 49 during the passage of brush 50 over segment 1 to produce the charge represented by D. The quantity and sign of the charge represented by the charge impressed upon condenser 49 by the neutralizing relay 39 is represented by E and as condenser 49 had had substantially impressed upon it the charge equal to D, the total charge remaining after brush 50 had passed off of segment 1 would be the algebraic sum of these two quantities which is represented by F. This remaining charge, therefore, is the time integral of the received signaling current impulses shown at A.

As brush 56 passes upon segment 1 of the distributor ring 34, condenser 49 is allowed to discharge through the windings of relay 55 and the resistance 59. This relay is thereby operated and battery is applied to the continuous ring 61 of the distributing section 35 and thence through brush 62 and segment 1 to the first of the selecting magnets comprising the receiving printer 63. During the passage of the brush 56 over segment 1 of the discharge section 34, the residual unbalance current, due to the next succeeding transmitted signaling current impulse impresses on condenser 48 a charge in a manner similar to that previously described, and the received signal current impulse in accordance with the applied charge on the condenser will act on the windings of relay 55 when the brush 56 engages segment 2 of the discharge section 34. It is thus seen that the condensers 48 and 49 act alternately to receive the sum of the residual unbalance current, the neutralizing current and the received signaling current impulses in which the unbalance current is neutralized by the neutralizing current impulse, due to the operation of relay 39.

Should the signaling current impulses transmitted upon the passage of the brush 42 onto any of the transmitting segments of the transmitting section 32 be followed by one or more signals of the same polarity, the second and all succeeding impulses of the same polarity would cause very little, if any, unbalance current to flow in the output circuit of the amplifier and the correcting network 28 and the operation of the neutralizing relay would therefore be unnecessary. This condition is provided for by the neutral adjustment of that relay, as previously described, which causes its armature to move to the center or no-contact position at times when the outgoing signaling current impulses drop to nearly zero during the transmission of a series of impulses of the same polarity. It should be observed that the wave form of the impulse impressed on the relay 55, due to the discharge of either condensers 48 or 49 may be altered by means of the adjustable resistance 59 to give the shape and amplitude which is most suitable for the operation of this relay. It is thus seen that the condensers 48 and 49, in addition to their function as storage devices for permitting the neutralization of unbalance currents, also act as storage devices for the received signaling current impulses to further make it possible to beneficially alter the wave form of the received signaling current impulses.

Although the invention has been disclosed and described with reference to a particular type of system, it is, of course, obvious that various modifications may be made without departing from the scope and spirit of the present invention. It is obvious, for example, that a more complex impedance can be used if desired in place of the resistance 51 for controlling the unbalance neutralizing current.

What is claimed is:

1. A method of signaling over lines employing balancing networks which consists in applying to said line signaling current impulses, storing a quantity of electricity in accordance with a current produced by said signaling current impulses due to lack of balance between the line and balancing network, and neutralizing the quantity of electricity thus stored.

2. A method of neutralizing unbalance currents produced by the transmission of signaling current impulses due to lack of balance between the real and artificial lines which consists in storing a quantity of electricity determined by the unbalance current, and applying to the thus stored quantity of electricity in accordance with the signaling current impulses transmitted a like quantity of electricity for neutralizing the effect of the unbalance current.

3. A method of neutralizing unbalance currents produced upon the transmission of signaling current impulses due to a lack of balance between the real and artificial lines which consists in storing a quantity of electricity dependent on the unbalance current, and neutralizing the quantity of electricity thus stored by applying a charge of an opposite sign in accordance with the signaling current impulses transmitted.

4. A method of signaling over lines employing balancing networks which consists in applying to said line signaling current impulses, producing a current wave corresponding to the lack of balance between the line and the balancing network, opposing said wave with another wave of such polarity and shape that when the two are simultaneously impressed upon an integrating device the integral of the resulting current over a certain period will be zero, and integrating the resulting current over said period, said unbalance wave and said other wave being sufficiently different in shape that they would not balance each other without integration.

5. In a signaling system, a line conductor, duplex equipment associated with said line, transmitting means connected to said duplex equipment, an output circuit therefor, means in said output circuit for storing the energy resulting from current produced upon the transmission of signaling current impulses due to lack of balance between the real and artificial lines, and means responsive to the operation of said transmitting means for neutralizing the energy stored in said storing means.

6. A telegraph system comprising a line conductor, duplex equipment associated with said line conductor, transmitting means, storing means for storing the energy resulting from current produced upon the operation of said transmitting means due to lack of balance between the real and artificial lines, and means responsive to the signals transmitted to said line conductor for applying to said storing means a neutralizing charge equal and opposite to the energy resulting due to the unbalanced condition.

7. A telegraph system comprising a line conductor, duplex equipment associated with said line conductor, transmitting means, an electrostatic means for receiving a charge resulting from a current produced upon the operation of said transmitting means due to a lack of balance between the real and artificial lines, and means responsive to the signals transmitted to said line conductor for applying to said electrostatic means a charge equal and opposite to the charge produced thereon by the current resulting due to the unbalanced condition.

8. A telegraph system comprising a line conductor equipped for duplex service, transmitting and receiving mechanisms associable with said line conductor, means for storing a quantity of electricity dependent on the current produced upon the operation of said transmitting means due to an unbalance between the real and artificial lines and any signaling current impulses then being received from said line, means responsive in accordance with the signaling current impulses transmitted by said transmitting mechanism for applying to said storing means a quantity of electricity for neutralizing the quantity of electricity resulting due to said unbalanced condition, and means for rendering the quantity of electricity remaining in said storing means effective on said receiving mechanism.

9. A method of signaling comprising causing electricity to flow in the form of a distorted signaling current storing said electricity and subsequently discharging it and producing a signal indication therefrom.

10. A method of signaling comprising integrating a distorted signal current during an interval of time and utilizing the integrated energy of said current during a subsequent interval of time to produce a signal indication.

11. In combination, a source of distorted signaling currents, a condenser, a signal responsive device and commutating means for connecting said condenser to said source during an interval of time and to said signal responsive device during a subsequent interval of time.

12. In combination, a telegraph conductor over which are received distorted signaling impulses, a condenser, a signal responsive device, and commutating means for connecting said condenser to said telegraph conductor during an interval of time and to said signal responsive device during a subsequent interval of time.

13. In telegraph signaling, the method of improving the shape of a distorted signal impulse which comprises storing the energy of said impulse and subsequently releasing it at a time rate different from that at which it was stored.

In witness whereof, I hereunto subscribe my name this 28th day of April A. D., 1926.

OLIVER E. BUCKLEY.